Mar. 27, 1923.
1,449,710
J. M. TURNAGE
AUTOMOBILE DISPLAY DEVICE
Filed Mar. 9, 1922
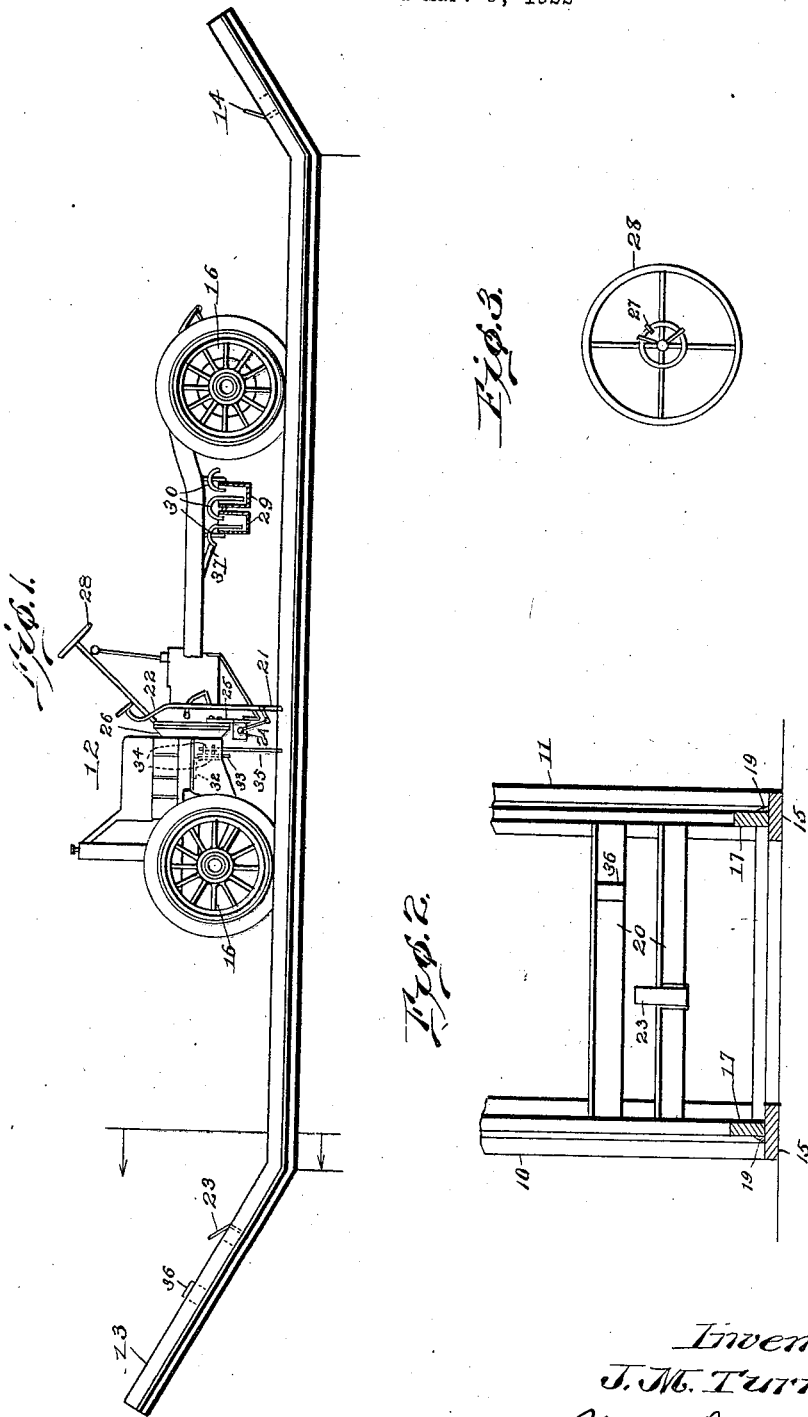
Inventor
J. M. Turnage Patented Mar. 27, 1923.

1,449,710

UNITED STATES PATENT OFFICE.

JULIUS M. TURNAGE, OF ATLANTA, GEORGIA.

AUTOMOBILE DISPLAY DEVICE.

Application filed March 9, 1922. Serial No. 542,300.

*To all whom it may concern:*

Be it known that I, JULIUS M. TURNAGE, a citizen of the United States, residing at Atlanta, in the county of Fulton and State of Georgia, have invented new and useful Improvements in Automobile Display Devices, of which the following is a specification.

This invention relates to display device for show rooms and particularly to means for displaying motor vehicles in an efficient and novel manner.

An important object of the invention is to provide a display apparatus for motor cars in which the latter will be exhibited in operation under its own power and caused to move back and forth within fixed limits.

An additional object is to provide a display device of the character above mentioned which can be readily installed in a show room and adapted to motor cars of various types.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a side elevation of the display device;

Fig. 2 is a cross section of the track taken on line 2—2 of Fig. 1; and

Fig. 3 is a detail view showing the sector clamp for locking the engine throttle.

Describing the invention in detail, 10 and 11, respectively, designate the rails of a track upon which is mounted a display model 12 of an automobile or other motor-vehicle.

This track may be laid across the floor of a show room and has an incline 13 at one end graduating to a height sufficient to roll car 12 to the opposite or rear end of the track, at which end a stop block 14 is secured to each rail. Dressed timber or other suitable material may be used in constructing the track and its length, as well as height of incline, may vary in proportion to the amount of floor space which is available. Each rail presents a flat base strip 15, which supports wheels 16 of the display car, and a vertically disposed strip 17 forming a wheel guard along the outside of which the car wheels travel, as shown in Fig. 1.

To save wear on the tires 18 the outside angle between the base strip and the wheel guard is provided with a triangular strip 19 of moulding. This strip extends the full length of the track and prevents the tires from rubbing against the wheel guard. Stringers or cross ties 20 connect the two rails on the inside and provide braces for the wheel guards, as will be seen in Fig. 2.

When the apparatus is in use, car 12 operates under its own power, being put in first or low gear by pressing clutch out in the usual way, after starting the motor. The clutch is automatically engaged and disengaged by a trip device including a trip lever 21 rigidly attached to the clutch pedal 22 of the display car for operating the clutch and a spring steel trip member 23 located on the incline of the track for engagement with the trip lever. As the car moves up the incline, lever 21 strikes against member 23 and is forced back, throwing the clutch out at the same time. The weight of the car then causes the same to roll off the incline, the clutch being held out of engagement by a hydraulic check until the car reaches the rear end of the track. The check is indicated generally at 24 and may be of any conventional form, such as a "Corbin door check" of the hydraulic type having the check-lever or arm connected to trip-lever 21 near the lower end of the latter as illustrated. This check is suitably supported by a plate 25 depending from the lower part of fly wheel housing 26 and allows lever 21 to come forward very slowly to engage the clutch whereby sufficient time is given the display car to reach the rear end of the track before the clutch is re-engaged. The re-engagement of the clutch causes the car to move forward along the track until lever 21 is again tripped, whereupon its direction of travel is reversed. This operation is repeated until the motor is shut off, the starting and reversing of the car being automatically effected as the machine travels under its own power.

During the running of the car the throttle of the engine may be locked by means of a clamp 27 which fastens to the sector on the steering wheel 28 of the car, as shown in Fig. 3, and to avoid any unpleasantness while demonstrating, the exhaust of the motor may be conducted through a purifier consisting of two vessels or containers 29 suitably supported from the frame of the car and partially filled with a liquid solution of 40% caustic soda and 60% water. The exhaust is conducted through this solution by means of sections 30 of rubber hose which extend into the containers as shown in the drawing, one section being directly connected to the exhaust pipe 31.

On the right side of the motor is fastened an angle bracket 32 on one arm of which is placed a single throw knife switch 33 connected by wires 34 in circuit with the spark coil of the ignition system. The blade of the switch is provided with an extension 35 which points straight down when the switch is closed. If, for any cause, member 23 should fail to stop the car by coming in contact with trip-lever 21, then as the car moves forward extension 35 engages a block 36 on the incline and is forced back, thus opening the switch and breaking the ignition circuit which causes the motor to immediately stop. This switch is installed as a safety stop for the display car in case any part of the device should fail to operate.

From the foregoing it is believed that the construction and operation of the invention can be readily understood, together with the advantages and benefits to be derived from a display apparatus of this character.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to within the scope of the appended claims without departing from or sacrificing any of the principles of this invention.

Having thus described my invention, and without enumerating variations and equivalents, what I desire protected by Letters Patent is as set forth in the following claims:

1. A display device for motor vehicles comprising a track having an incline, a display model movable along the track and incline under its own power, and means operating to shut off the power when the model is on the incline whereby it is free to drift back along the said track, said means automatically operating after an interval to propel the model forward under its own power.

2. A display device for motor vehicles including a track having an incline, a display model movable under its own power along said track, a trip-lever depending from the clutch pedal of the model, means for tripping the lever to disengage the clutch when the model is on the incline, and means for holding the clutch out until the model has reached the opposite or lower end of the track.

3. A display device for motor vehicles including a track having an incline, a display model movable along said track, a trip lever depending from the model, means for tripping the lever to disengage the clutch when the model reaches a predetermined point in a forward direction, and means for holding the clutch out and automatically releasing it when the model has reached a predetermined point in the reverse direction.

JULIUS M. TURNAGE.

Witnesses:
D. E. McCord,
F. E. Moffett.